May 4, 1926.

W. S. F. BROWN ET AL 1,583,276

PINION

Filed July 17, 1925

WESTGARTH STANHOPE FORSTER BROWN
AND JOSEPH MAINA
INVENTORS

BY Wm Wallace White
ATTORNEY.

Patented May 4, 1926.

1,583,276

UNITED STATES PATENT OFFICE.

WESTGARTH STANHOPE FORSTER BROWN AND JOSEPH MAINA, OF LONDON, ENGLAND.

PINION.

Application filed July 17, 1925. Serial No. 44,215.

*To all whom it may concern:*

Be it known that we, WESTGARTH STANHOPE FORSTER BROWN and JOSEPH MAINA, subjects of the Kings of Great Britain and Italy, respectively, residing at London, England, have invented new and useful Improvements in or Relating to Pinions, of which the following is a specification.

This invention relates to roller-bearing or ball-bearing pinions for use in gearing, and has been made with the object of providing improvements therein and relating thereto.

In ball-bearing pinions as hitherto made, it has been proposed to shape the body of the pinion so as to receive a double cone ball race, adapted to be adjusted by axial tightening of the pin on which the pinion is mounted. For the purpose of obtaining the shape of the outer race, the internal diameter of the bore is necessarily smaller than the diameter of the outer race.

When it is desired to use roller-bearings, there is no need for the inner bore to be smaller than the outer race, but the simplest way of maintaining the roller cages at the correct distance one from the other is to provide on the body of the pinion a slight internal shoulder between the two cages in the known manner, so that the internal diameter of the bore is smaller than the diameter of the outer race by the required extent.

When it is necessary to use a very small pinion in combination with bearings of high capacity load, it may be desirable to employ roller-bearings, but in that case the outer race would be of too large a diameter and the material left to carry the teeth of the pinion would not have a sufficient strength to withstand the stresses. The object of this invention is to provide a pinion of very small size, adapted to be used with roller-bearings, and of sufficient strength to withstand the stresses to which it is exposed in a bearing of high capacity load.

According to this invention, we provide a pinion the internal bore of which is reduced beyond what is necessary for maintaining the roller cages in position, as described above, so that the peripherial portion of the pinion, carrying the teeth, can be reduced to a very small thickness.

A pinion made in accordance with this invention has its internal bore wider, in an axial direction, than the roller or ball-bearings on which it runs and its internal diameter, between or beyond the bearings, is reduced, so as to provide a strong pinion with roller or ball-rings of maximum practicable diameter. (The term "ball-ring" or "roller-ring" is used herein to describe a set of balls or rollers and the cage in which they are retained.)

The drawings left herewith show one form of pinion made in accordance with this invention.

Fig. 1 shows a sectional side view of the assembled pinion.

Fig. 2 a sectional end view of the same.

Figure 1:
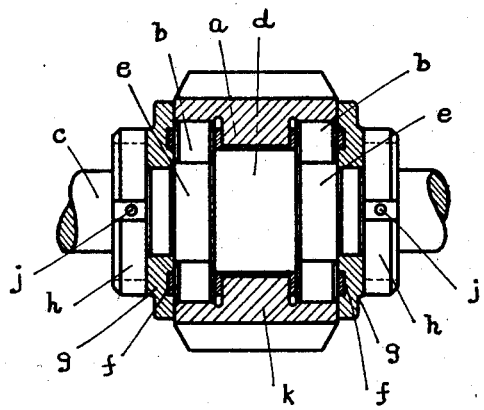
Figure 2:
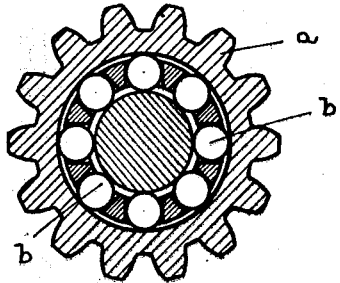
Figure 3:
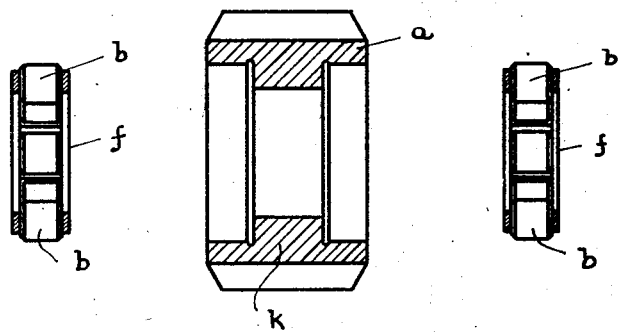
Fig. 3 shows a sectional side view of the pinion without the shaft and with the cages and rollers dismounted.
Figure 4:
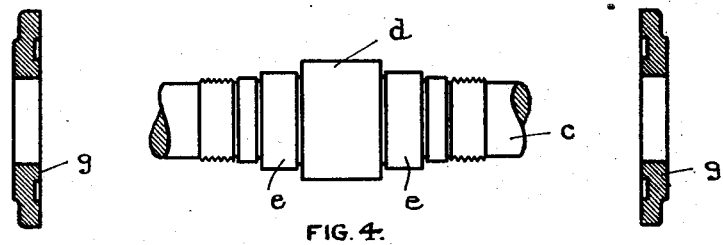
Fig. 4 shows the shaft, and the retaining washers in section.

In this form the pinion wheel $a$ is recessed at each side, and two sets of rollers $b\ b$ are fitted into the recesses. The shaft $c$ has an enlarged centre $d$ and two portions $e\ e$ of less diameter than this which form races for the rollers.

The cages $f\ f$ which retain the rollers are of such internal diameter that they fit the enlarged part $d$ of the shaft in the manner shown, with a small clearance, and they project outwardly into grooves in the retaining washers $g\ g$, which washers are themselves kept in place by the collars $h\ h$, which are screwed on to the shaft and secured thereto with the set screws $j\ j$.

The internal bore of the pinion is reduced in the middle in the manner shown to provide an internal rib $k$.

A roller or ball-bearing pinion made in accordance with this invention can be made to embody ball-rings or roller-rings of large diameter without unduly weakening either the pinion wheel or the shaft.

In particular we contemplate the use of pinions made in accordance with this invention as intermediate pinions in motor-car gear boxes, or as satellite pinions in epicyclic gear boxes, and more particularly we contemplate the use of such pinions in the epicyclic gear box set out in our U. S. A. application for Letters Patent, Serial No. 683,316, but they are obviously applicable to a variety of other uses.

What we claim and desire to secure by Letters Patent is:

1. A roller bearing pinion and mounting therefor comprising a pinion having a recess at each side and an internal bore of reduced diameter between said recesses, a shaft having an enlarged centre, and two portions of less diameter vertically aligned with the recesses in the pinion, sets of rollers fitting into said recesses and adapted to cooperate with the portions of less diameter on the shaft which form races therefor, a cage for retaining each set of rollers in place, a washer loose on the shaft abutting each cage, and collars adapted to be secured to the shaft for retaining said washers in place.

2. A roller bearing pinion and mounting therefor comprising a pinion having a recess at each side and an internal bore of reduced diameter between said recesses, a shaft having an enlarged centre, two portions of less diameter vertically aligned with the recesses in the pinion and a screw-threaded portion beyond each of said reduced portions, sets of rollers fitting into said recesses in the pinion and adapted to cooperate with the reduced portions of the shaft and which form races therefor, a cage for retaining each set of rollers in place, a washer loose on the shaft abutting each cage, collars for retaining said washers in place adapted to be screwed on said screw-threaded portions of the shaft and means for holding said collars on said screw-threaded portions.

In testimony whereof we have signed our names to this specification.

WESTGARTH STANHOPE FORSTER BROWN.
JOSEPH MAINA.